THERMALLY RESPONSIVE ELECTRICAL SWITCHES

Filed Feb. 9, 1962 3 Sheets-Sheet 1

INVENTORS:
ROBERT H. LADD,
ROBERT M. GLIDDEN,
BY Harold Levine
ATT'Y.

INVENTORS:
ROBERT H. LADD,
ROBERT M. GLIDDEN,
BY Harold Levine
ATT'Y.

THERMALLY RESPONSIVE ELECTRICAL SWITCHES

Filed Feb. 9, 1962 3 Sheets-Sheet 3

INVENTORS:
ROBERT H. LADD,
ROBERT M. GLIDDEN,
BY Harold Levine ATT'Y.

United States Patent Office 3,157,768
Patented Nov. 17, 1964

3,157,768

THERMALLY RESPONSIVE ELECTRICAL SWITCHES

Robert H. Ladd, Frankfort, and Robert M. Glidden, Versailles, Ky., assignors to Texas Instruments Incorporated, Dallas, Tex., a corporation of Delaware Filed Feb. 9, 1962, Ser. No. 172,222
11 Claims. (Cl. 200—138)

This invention relates to thermally responsive electrical switches and more particularly to mounting brackets or flanges therefor.

Among the several objects of this invention may be noted the provision of thermally responsive electrical switches and detachable mounting flanges therefor; the provision of such switches and mounting flanges which can be quickly and easily detachably secured together; the provision of such devices wherein one electrical switch can be employed with and detachably connected to any one of several different types of interchangeable mounting flanges; and the provision of electrical switches and detachable mounting flanges therefor which are economical to manufacture and which can be quickly and economically assembled.

Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of the various possible embodiments of the invention are illustrated:

Figure 9:
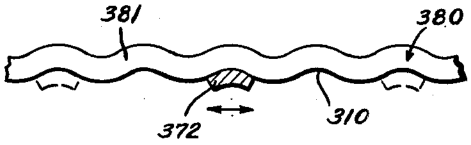
Figure 10:
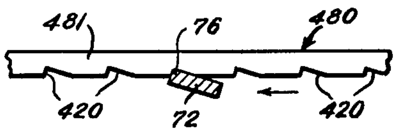

FIGS. 9 and 10 respectively are fragmentary elevational views showing a developed inside edge of a mounting flange at a part thereof around the thermostat housing receiving opening therein respectively according to a fifth and sixth embodiment of the present invention.

Similar reference characters indicate corresponding parts throughout the several views of the drawings.

Dimensions of certain of the parts as shown in the drawings may have been modified and/or exaggerated for the purposes of clarity of illustration.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Thermally responsive electrical switches, particularly those of the snap-acting disc type have heretofore been made in a variety of housing configurations and with different types of mounting brackets or flanges to meet specific application requirements, the mounting brackets or flanges generally differing mainly in dimension, configuration, number of bolt receiving holes, etc. Such mounting brackets or flanges heretofore have generally been formed integrally with or permanently secured to the switch housing. This has the drawback of requiring the manufacture and inventory maintenance of a large variety of thermostats or switches which in many cases differ only in the type of mounting brackets required for specific applications. The present invention proposes to obviate or at least minimize this drawback by providing a plurality of different interchangeable detachable mounting brackets or flanges, any one of which can quickly and easily be detachably connected to a standard type of thermostat. Thus, according to the invention, one or more standard types of thermostats or electrical switches can conveniently and economically be mass produced and supplied with a kit of assorted types of interchangeable mounting flanges each of which can be quickly and easily detachably connected to the thermostat so as to mount the thermostat on a support in thermal juxtaposition to a substance or device whose temperature is to be sensed. The present invention also simplifies thermostat identification, permits maintaining an economically smaller inventory and provides increased versatility of application for the thermally responsive switches.

Figure 1:
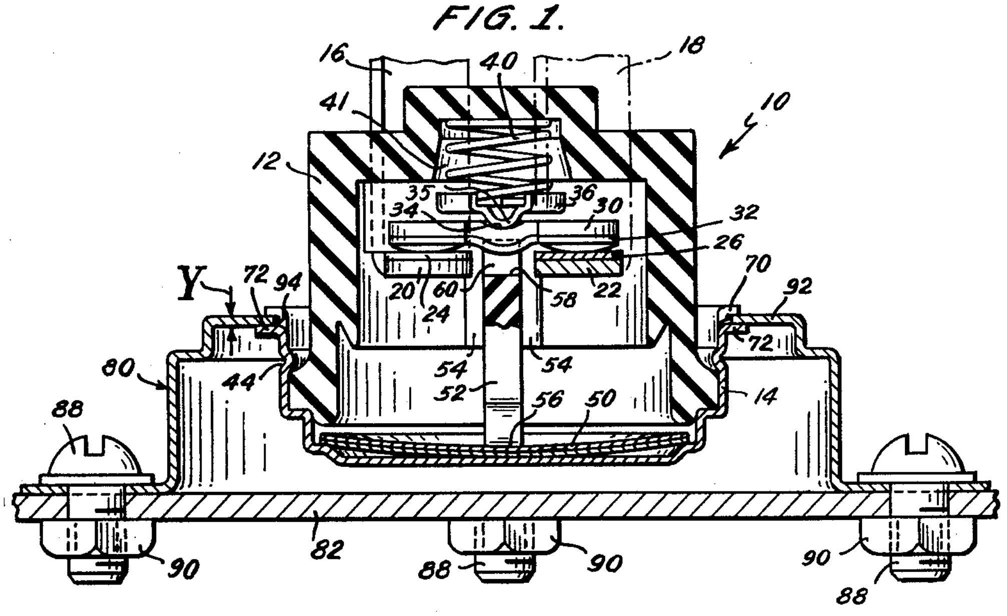
FIG. 1 is a sectional view of an electrical switch and mounting bracket or flange embodying the invention.

Referring now to FIG. 1 of the drawings an exemplary switch construction in the form of an automatically resetting, thermally responsive snap-acting switch 10 is shown which may be employed in the practice of the present invention. Switch 10 is of the type shown and described in U.S. Patent 2,824,194 to J. O. Moorhead issued on February 18, 1958, to which patent reference may be had for details of construction. Electrical switch 10 includes a two-part housing 12 and 14. Housing part 12 is formed of an electrical insulating material such as one of the customary molded plastics. A pair of terminals 16 and 18 are supported by the housing member 12 in any suitable manner. By way of example, casing member 12 may be molded about these terminals. Each of terminals 16 and 18 leads to the exterior of the casing member 12 whereby it may be externally connected in an electrical circuit.

Terminals 16 and 18 provide contacts or contact forming portions 20 and 22, each of which may be respectively provided with layers or portions 24 and 26, formed of a material having a high electrical conductivity such as silver and the like. Terminals 16 and 18 except for layers 24 and 26, may be formed of any suitable electrically conductive material such as for example brass, Monel or copper. An electrically conductive bridging contact member 30 formed, for example of brass, Monel or copper, is disposed adjacent contacts 24 and 26. The contact forming surface of contact member 30 which cooperates with the adjacent surface of contacts 24 and 26 may be formed of a layer or portion 32 of silver or other contact alloy which is suitably bonded to the remainder of contact member 30. Contact member 30 is engageable and disengageable with both of contacts 24 and 26 to electrically connect and disconnect contacts 24 and 26.

The upper surface of bridging contact member 30, as shown in FIG. 1, provides a concavely curved surface 34 which is associated with a convexly curved surface 35 provided by the bottom of a generally cup-shaped member 36. One end of a compression spring 40 is seated in the cup-shaped member 36 and the other end thereof seated in a socket 41 provided by the casing member 12. Accordingly, spring 40 resiliently biases contact member 30 against contacts 24 and 26.

The open end of casing member 12 is closed by a metallic heat conductive cup member 14 which may be spun or otherwise turned in about its periphery as at 44 to secure it to casing member 12. Disposed within cup 14 is a thermally responsive snap-acting disc or element 50. As best seen in FIG. 1 the outer annular marginal periphery of thermally responsive element 50 is engaged with and supported by an interior step of cup 14 and is supported in intimate, direct heat conductive or heat transfer relation to cup 14. Disc 50 may be of the bimetallic type as shown and described in United States Patent No. 1,448,-240 to J. A. Spencer issued March 13, 1923. Disc 50 as shown in FIG. 1 is in a downwardly bowed condition. In response to a predetermined ambient temperature change disc 50 will snap to an upwardly bowed condition of opposite configuration. A motion transfer member 52 is slidably received and guided for reciprocal vertical movement (as seen in FIG. 1) by opposed recesses 54 provided by casing member 12. One end 56 of motion transfer member 52 is disposed in abutment with a central portion of disc 50 and the other end thereof provides a flat surface 58 disposed adjacent the bridging contact member 30. The upper portion of member 52 is bifurcated and provides a pair of legs 60 (only one of which is shown in FIG. 1) which are received within suitable recesses provided in bridging contact member 30.

When disc 50 snaps to the upwardly bowed shape in response to a predetermined temperature change, it quickly moves motion transfer member 52 and the bridging contact member 30 upwardly (as seen in FIG. 1) against the resilient bias of spring 40 to separate contact member 30 from the spaced contacts 24 and 26 to open the circuit through switch 10. When discs 50 snaps back to the configuration shown in FIG. 1 in response to a temperature change in the opposite direction, it permits contact member 30 and motion transfer member 52 to return quickly to the contacts-closed condition under the bias of spring 40.

Figures 2, 3:
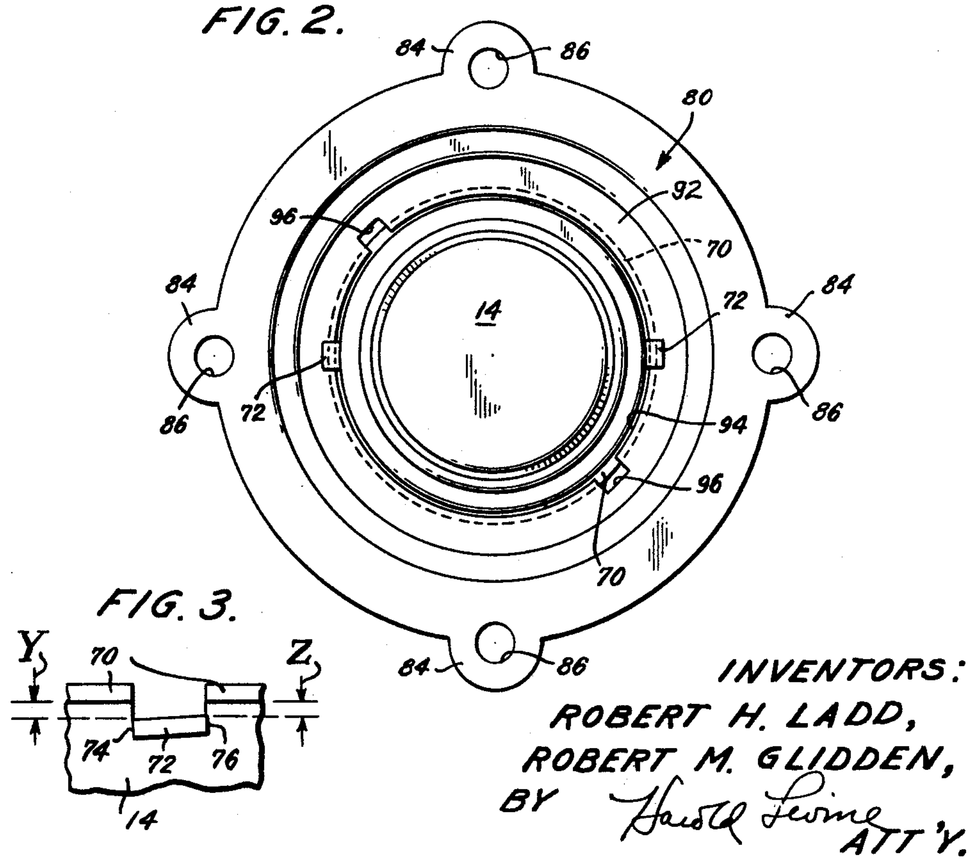
FIG. 2 is a bottom view of the switch and mounting flange shown in FIG. 1 on a reduced scale and with the support omitted for purposes of clarity of illustration.
FIG. 3 is an enlarged fragmentary elevational view of a portion of the switch housing showing a locking tab according to the present invention.

Cup 14 is provided with a pair of annularly or circumferentially extending lip portions 70 formed integrally therewith and a pair of spaced radially projecting tab portions 72 which may be struck out from and formed integrally with cup 14. As best seen in FIG. 3 projecting tabs 72 are spaced from and disposed at an angle to circumferentially extending and projecting lip portions 70. As seen in FIG. 3, one edge 74 of tabs 72 is spaced a distance Y from lip 70 while the other edge 76 thereof is spaced a distance Z from lip 70, the distance Y being greater than the distance Z.

In FIGS. 1 and 2 is shown one example of a flange generally designated at 80 which may be employed with and detachably connected to switch 10 for mounting the switch on a support 82. Flange 80 is adapted to mount the switch 10 with the snap-acting disc 50 thereof in thermal juxtaposition to a substance or something, whose temperature is to be sensed, for example, a flow of air, where the switch 10 is employed in a clothes dryer application, or to sense the temperature of a liquid, for example, in a laundry machine application. As best seen in FIG. 2, mounting flange or bracket 80 includes a plurality of eared portions 84 each having a bolt receiving aperture 86 for the reception of bolts 88 which co-operate with nuts 90 to mount the flange on support 82 as shown in FIG. 1. Flange 80 is provided with a central plate-like body portion 92 having a thickness Y as shown (see FIG. 1). Portion 92 provides a centrally located aperture 94 for receiving at least a portion of casing member 14. The opening 94 is sufficiently larger than the portion of casing 14 to be received or accommodated therein to provide a thermal barrier to impede heat transfer between the flange 80 and casing 14 or disc 50. Portion 92 of flange 80 further includes a pair of diametrically spaced, radially projecting slots or openings 96 which communicate with opening 94 and are adapted to receive and permit tabs 72 to be inserted therethrough.

From the above it will be seen that switch 10 can be quickly and easily detachably firmly locked or secured to mounting flange 80 merely by inserting switch 10 into the opening 94 with tabs 72 inserted through openings 96, and thereafter, rotating switch 10 relative to flange 80 so that the central body portion 92 around the opening 94 will be tightly received and gripped between lips 70 and tabs 72. In this condition, corner 76 of angularly disposed tabs 72 will resiliently and wedgingly engage and bite into the underside of the central body portion 92 (around opening 94) to tightly secure the parts together and inhibit undesired and unintentional rotation between the parts in at least one direction which could result in separation of the parts for example due to vibration. The invention is particularly useful for (though not limited to) replacement parts in that it eliminates the necessity for retaining large inventories of specially designed and configured mounting bracket thermostat constructions for long periods of time. To replace an earlier type thermostat construction, it is now only necessary to supply the required type mounting flange and to detachably connect it to a standard type thermostat, having the required rating, thus providing maximum application flexibility.

Another advantage of the construction of the present invention over that of the former integral mounting flange-type switch construction is that with the detachable flange arrangement less heat is conducted away from the thermally responsive member 50 than with the former type integral construction, thereby providing greater efficiency and sensitivity of operation for the thermally responsive switch 10.

The FIGS. 1–3 embodiment also provides another advantage over the conventional integral flange switch constructions in affording flexibility and versatility for orienting terminals 16 and 18 with respect to flange 80, to meet specific requirements of particular applications. Since tabs 72 will wedgingly interlock switch 10 to flange 80 in any one of a variety of positions, switch 10 can advantageously by rotated with respect to flange 80 until desired orientation and alignment of terminals 16 and 18 is effected. Tabs 72 will thereafter maintain switch 10 detachably interlocked to flange 80 in the adjusted position.

Figure 4:
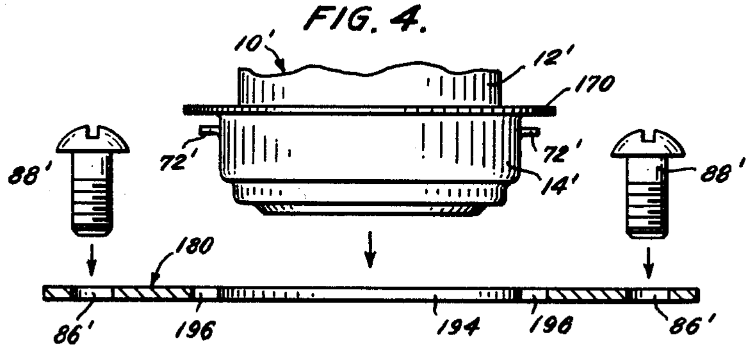
FIG. 4 is an exploded elevational view illustrating a second embodiment according to the present invention.
Figure 5:
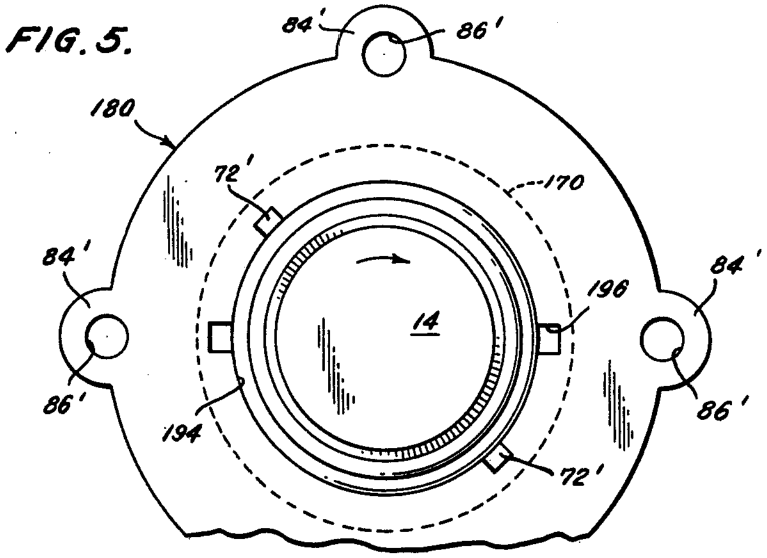
FIG. 5 is a bottom plan view of the parts shown in FIG. 4 in assembled, locked relation.

Referring now to FIGS. 4 and 5, there is shown a second embodiment according to the present invention. In this regard those parts of the modified arrangement in FIGS. 4 and 5 which have primed reference numerals are or may be identical with their respective counterparts in FIGS. 1–3, having the same but unprimed reference numerals. In the FIGS. 4 and 5 embodiment the mounting flange 180 comprises a flat washer-like member which is provided with an opening 194 for receiving a portion of casing 14′ of switch 10′. Flange 180 also includes a pair of diametrically spaced radially projecting slots 196 which communicate with opening 194 and are arranged for registering with and permitting radially projecting tabs 72′ to be inserted therethrough. Casing member 14′ is provided with a pair of peripherally and circumferentially extending lip portions 170 which are generally similar to lip portions 70 of switch 10, except that in the FIGS. 4–5 embodiment, lip portions 170 extend or project radially outwardly far enough so as to completely seal opening 194 and slots 196 when the switch 10′ is detachably locked to flange 180 in the manner described above for switch 10 and flange 80, the locked, rotated position being shown in FIG. 5. Lip portion 170 as shown in the detachably interlocked condition in FIG. 5, advantageously tightly seals openings 194 and slots 196. This construction is particularly useful for clothes dryer equipment applications where it is necessary to prevent the passage of lint from one side of the flange through to the other side, and also for laundry equipment applications where it is necessary to provide a watertight closure between the control and the flange. Flange 180, like flange 80, also includes a plurality of mounting ears 84' each of which includes bolt receiving apertures 86' for mounting the switch 10 on a support such as 82" (shown in FIG. 6) which has an opening 83 through which switch 10' extends or projects and can be mounted in thermally conductive juxtaposition to a substance whose temperature is to be sensed. The FIGS. 4–5 embodiment affords substantially all of the advantages of the FIGS. 1–3 embodiment described above.

Figure 6:
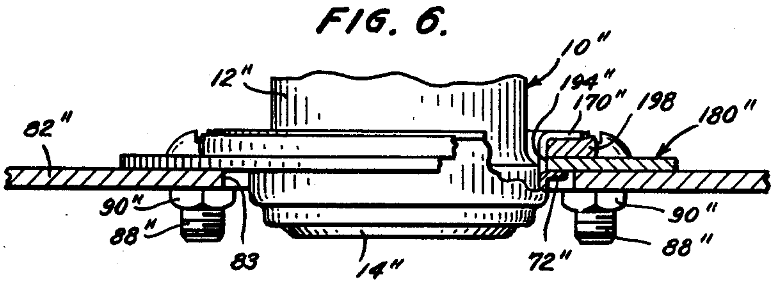
FIG. 6 is a fragmentary elevational view with certain parts in section, illustrating a third embodiment according to the present invention.

Illustrated in FIG. 6 is a third embodiment of the invention in which those parts having double primed reference numerals are or may be identical with their respective counterparts in FIGS. 1–3 and 4–5 having the same but primed or unprimed reference numerals. The FIG. 6 embodiment differs mainly from the FIGS. 4–5 embodiment in the provision of a gasket or sealing member 198 intermediate lip portions 170" and flange 180" as shown. Gasket member 198 is ring like in form and is preferably formed of a flexible, deformable, thermally insulating material which serves to further minimize the amount of heat which can be conducted away from the thermal element 50 by the flange 180", as well as to provide a positive watertight and air or lint-tight seal between the switch 10" and the flange 180". Gasket 198 may be made of a suitable compressible fibrous material or a rubber-like material such as, for example, silicone rubber. The FIG. 6 embodiment affords substantially all of the advantages described above for the FIGS. 1–3 embodiment, in addition to the advantages afforded by the sealing gasket or washer member 198.

Figures 7, 8:
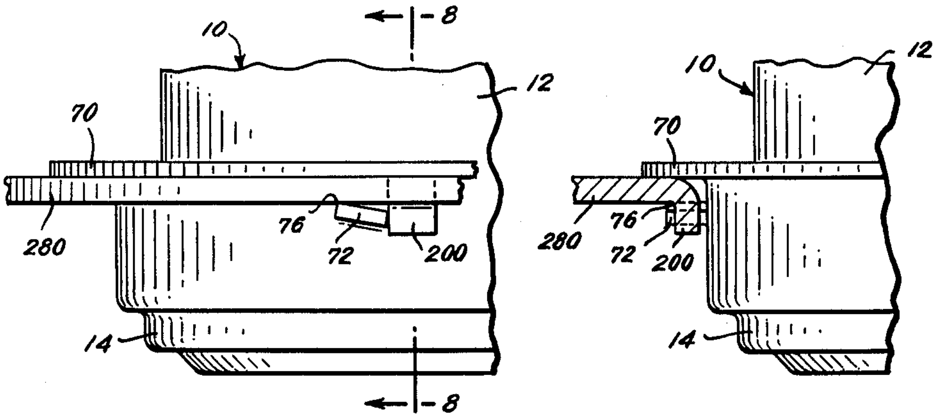
FIG. 7 is a fragmentary elevational view illustrating a fourth embodiment according to the present invention.
FIG. 8 is a view taken on line 8—8 of FIG. 7.

Referring now to FIGS. 7 and 8, there is illustrated a fourth embodiment of the present invention. Those parts in the FIGS. 1–3 and FIGS. 7–8 embodiments having the same reference numerals are or may be substantially identical. The FIGS. 7–8 embodiment differs mainly from the FIGS. 1–3 embodiment in the provision of stop means on the mounting flange 280 for limiting relative rotation between thermally responsive switch 10 and the mounting flange or bracket in one direction. Flange 280 is provided with a pair of spaced downwardly extending abutment stop members 200. Abutment members 200 may be diametrically opposed toward each other and are preferably arranged so that an imaginary line drawn therebetween intersects an imaginary line drawn between the slots 96. Stops 200 project downwardly far enough to engage tab members 72 to limit relative rotation between the switch 10 and flange 280 in one direction. Stops 200 in co-operating with tabs provide a positive means for orienting and aligning switch 10 with respect to flange 280 to orient and align the switch terminals 16 and 18 as may be required for a particular application. Stops 200 co-operate to prevent any tendencies for unintentional relative rotation between the switch 10 and the flange 280 in one direction, which might take place due to vibration. Unintentional relative rotation between switch 10 and flange 280 in the other direction is prevented by the wedging engagement of corner 76 of tab 72 with the underside of flange 280, as seen in FIG. 7. It will be understood that the relationship between stops 200 and slots 96 can be varied as desired to orient and align the terminals 16 and 18 as required for a particular application.

Referring now to FIGS. 9 and 10, there is shown two further embodiments of the present invention, each of which is applicable to each of the embodiments of FIGS. 1–3, 4–5 and 6. FIGS. 9 and 10 illustrate a developed inside edge of the mounting flange 80, adjacent the switch receiving opening therein, looking in a direction, radially outwardly from the opening. In FIGS. 9 and 10 the flanges are respectively generally designated by numerals 380 and 480. The circumferential inside surface defining the switch receiving opening in each of flanges 380 and 480 are respectively designated at numerals 381 and 481. The portion of flange 380 surrounding the switch receiving opening therein according to the FIG. 9 embodiment is provided with a series of radial undulations providing a series of spaced arcuate shaped tab receiving pockets 310 along the underside thereof as shown. Tabs 372 have an arcuate shaped cross-sectional configuration and are adapted to mate and interfit with the arcuate shaped pockets 310. Tabs 372 co-operate with pockets 310 to advantageously prevent undesirable and unintentional rotation between the switch 10 and flange 380 in all directions which might otherwise tend to take place due to vibration. Further, terminals 16 and 18 of switch 10 can quickly and easily be oriented and aligned to meet requirements for a particular application by rotating housing 10 until tabs 372 are seated in the proper pair of tab receiving pockets 310. Flange 380 provides substantially all of the advantages of the FIG. 7 flange 280 and also further provides for greater versatility and flexibility of application, since the terminal orientation may be varied as desired merely by rotating the switch 10 with respect to flange 380 in either of two directions as shown by the arrow and dashed-line tab positions in FIG. 9.

In the FIG. 10 embodiment the portion of flange 480 surrounding the switch 10 receiving opening is provided with a plurality of circumferentially spaced, radially extending notches 420 which are adapted to receive edge 76 of tab 72 to wedgingly receive and lock tab 72 and switch 10 against rotation relative to flange 480 in the direction of the arrow shown in FIG. 10. Notches 420 in their co-operation with edge 76 of tab 72 provide substantially all of the advantages described above for the FIGS. 1–3 embodiment. In the FIGS. 1–3 embodiment relative rotation between switch 10 and flange 80 (in the direction of the arrow in FIG. 10) is also limited by the biting and wedging engagement of the corner 76 of tab 72 with the underside of the flange 80. However, the FIG. 10 arrangement provides a more definite and positive type of stop to inhibit this relative rotation.

It will be understood that in both of the embodiments of FIGS. 9 and 10, the entire circumference of the area of the flange surrounding the switch receiving opening therein, need not be provided with the undulated pockets 310 or the notches 420 but that only a portion or portions thereof can be so provided, as desired within the purview of the invention.

From the above it can be seen that the present invention provides both versatility and economy, and avoids the necessity for stocking and manufacturing a new thermostat every time a different shaped mounting flange or configuration is required.

In view of the above, it will be seen that the several objects of the invention are achieved, and other advantageous results attained.

It will be understood that the configuration of the mounting flanges shown in the drawings are for purposes of illustration only and that other configurations may be employed within the purview of the present invention.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

We claim:

1. In combination: an electrical switch including a pair of electrical contacts and a thermally responsive member operatively connected to actuate said contacts; a hollow housing enclosing said contacts and thermally responsive member; support means for mounting said switch in thermal juxtaposition to something whose temperature is to be sensed; said support means including an opening receiving at least part of said housing which includes said thermally responsive member; said opening being sufficiently larger than required to accommodate said part of said switch housing to impede heat transfer between said support means and housing; and means detachably locking said housing to said support means.

2. In combination: an electrical switch including a pair of electrical contacts and a thermally responsive member operatively connected to actuate said contacts; a cup-shaped housing enclosing said contacts and thermally responsive member, a portion of said housing being formed of thermally conductive material and supporting said thermally responsive member in heat conductive relation therewith, said housing portion including outwardly projecting lip portions and a spaced pair of outwardly projecting tabs spaced from said lip portions; a mounting flange for mounting said switch on a support in a thermal juxtaposition to a substance whose temperature is to be sensed; said flange being formed separately from said switch and support and also being provided with a first opening receiving therein said portion of said housing, said flange also including a pair of spaced openings communicating with said first opening for receiving the projecting tabs on said housing; said tabs being so spaced from said lip portions as to tightly receive therebetween, portions of said flange around said first opening, detachably locking said housing portion to said flange when said housing and tabs are respectively inserted through said first and pair of openings and said housing is rotated with respect to said flange.

3. The combination as set forth in claim 2 and including a washer disposed intermediate said lip and flange closing and sealing said slots.

4. The combination as set forth in claim 3 and wherein said washer is formed of thermally insulating material.

5. The combination as set forth in claim 2 and wherein said lip portions project outwardly to such an extent as to cover and seal said pair of openings when said housing is detachably locked to said flange.

6. The combination as set forth in claim 2 and wherein said flange includes abutment means engageable with said tabs to limit relative rotation between said housing and flange in one direction.

7. In combination: an electrical switch including a pair of electrical contacts and a thermally responsive member operatively connected to actuate said contacts; a cup-shaped housing enclosing said contacts and thermally responsive member, a portion of said housing being formed of thermally conductive material and supporting said thermally responsive member in heat conductive relation therewith, said housing portion including outwardly projecting lip portions and a spaced pair of outwardly projecting tabs spaced from said lip portions; a mounting flange for mounting said switch on a support in a thermal juxtaposition to a substance whose temperature is to be sensed; said flange being formed separately from said switch and support and also being provided with a first opening receiving therein said portion of said housing, said flange also including a pair of spaced openings communicating with said first opening for receiving the projecting tabs on said housing; said tabs being so spaced from said lip portions as to tightly receive therebetween, portions of said flange around said first opening, detachably locking said housing portion to said flange when said housing and tabs are respectively inserted through said first and pair of openings and said housing is rotated with respect to said flange; said tabs being angularly disposed with respect to said lip portions whereby to wedgingly engage said flange when said housing and tabs are respectively inserted through said first opening and said pair of spaced openings and said housing is rotated with respect to said flange; said flange on the side thereof engaged by said tabs, being provided with a plurality of spaced notches around said first opening for engagement with said tabs to limit relative rotation between said housing and flange in one direction.

8. The combination as set forth in claim 2 and wherein said flange, on the side thereof engaged by said tabs, is provided with an undulating surface around said opening providing a plurality of tab receiving pockets.

9. The combination as set forth in claim 8 and wherein said tabs have an arcuate shaped cross-sectional configuration to mate and interfit with selected ones of said pockets.

10. In combination: an electrical switch inclduing a pair of electrical contacts and a thermally responsive member operatively connected to actuate said contacts; a hollow housing enclosing said contacts and thermally responsive member; a plurality of interchangeable mounting flanges each for selectively mounting said switch on a support in thermal juxtaposition to something whose temperature is to be sensed; each of said plurality of flanges being formed separately from said switch and support and each of said flanges having a plate-like portion provided with an opening therein selectively receiving therein at least part of said housing; and means on said housing detachably locking said housing to one of said flanges and said interconnection between said housing and flange impeding heat transfer therebetween.

11. In combination: an electrical switch including a pair of electrical contacts and a thermally responsive member operatively connected to actuate said contacts; a cup-shaped housing enclosing said contacts and thermally responsive member, a portion of said housing being formed of thermally conductive material and supporting said thermally responsive member in heat conductive relation therewith; said housing portion having projecting lip portions; a plurality of interchangeable mounting flanges each selectively adapted to mount said switch on a support in thermal juxtaposition to something whose temperature is to be sensed; each of said plurality of mounting flanges being formed separately from said switch and support and each being provided with an opening selectively receiving therein said portion of said housing with said lip portions bearing against one side of the flange around said opening; said opening in each of said plurality of flanges being sufficiently larger than required to accommodate said switch housing portion whereby to impede heat transfer between said support and housing portion and means detachably locking said housing to one of said flanges.

References Cited in the file of this patent

UNITED STATES PATENTS

| | | |
|---|---|---|
| 2,093,038 | Douglas | Sept. 14, 1937 |
| 2,562,390 | Popp | July 31, 1951 |
| 2,814,702 | Mucher | Nov. 26, 1957 |
| 2,885,905 | Larkin | May 12, 1959 |
| 2,907,851 | Moorhead et al. | Oct. 6, 1959 |

FOREIGN PATENTS

| | | |
|---|---|---|
| 1,193,016 | France | Oct. 29, 1959 |